= [54] METHOD OF APPLYING MINIATURIZED HIGH-TEMPERATURE FREE-GRID STRAIN GAUGES

[75] Inventors: Heinrich Franz Bauer; Anton Eichinger, both of Eichenau; Ernst Feitzelmayer, Munich, all of Fed. Rep. of Germany

[73] Assignee: Motoren-und Turbinen-Union Munchen GmbH, Munich, Fed. Rep. of Germany

[21] Appl. No.: 787,613

[22] Filed: Apr. 14, 1977

[30] Foreign Application Priority Data

Jul. 7, 1976 [DE] Fed. Rep. of Germany ....... 2630475

[51] Int. Cl.² .......................................... B32B 31/00
[52] U.S. Cl. ..................... 156/155; 29/423; 29/610 SG; 156/344; 156/249; 338/2
[58] Field of Search ................ 156/64, 249, 155, 344, 156/247; 338/2; 73/88.5 R; 33/174 L; 228/177, 179; 29/423, 424, 610 SG; 140/71 A

[56] References Cited

U.S. PATENT DOCUMENTS

| | | |
|---|---|---|
| 2,626,338 | 1/1953 | Mitchell ............................... 156/344 |
| 2,899,658 | 8/1959 | Bean ..................................... 338/2 |
| 2,927,878 | 3/1960 | Beckman ............................. 156/155 |
| 3,082,139 | 3/1963 | Clark .................................... 338/2 |
| 3,121,491 | 2/1964 | Weymouth ........................... 29/423 |
| 3,698,976 | 10/1972 | Ake et al. ............................ 156/155 |

*Primary Examiner*—Douglas J. Drummond
*Assistant Examiner*—J. J. Gallagher
*Attorney, Agent, or Firm*—Scully, Scott, Murphy & Presser

[57] ABSTRACT

A method of applying miniaturized high-temperature free-grid strain gauges to a test location by welding an auxiliary temporary backing to a strain gauge equipped with supporting or backing foil and connecting excess-length connecting webs thereto for manipulation of the gauge. Thereafter, the strain gauge is adhered, grid side facing downwardly, to a porous backing by means of an adhesive, the backing foil is then stripped off and the adhesive dissolved by a chemical solvent. The strain gauge is then applied to the test location and affixed thereto.

7 Claims, 4 Drawing Figures

METHOD OF APPLYING MINIATURIZED HIGH-TEMPERATURE FREE-GRID STRAIN GAUGES

BACKGROUND OF THE INVENTION

1. Field of the Invention

The present invention relates to a method of applying miniaturized high-temperature free-grid strain gauges, more particularly those which are constructed of foil, and similarly constructed temperature measuring probes.

2. Discussion of the Prior Art

Presently known strain gauges have heretofore been limited to maximum temperatures of approximately 250° C. during static or long term endurance tests, and to approximately 290° C. and individually on occasion up to 400° C., during relatively brief or short term dynamic measurements. Hereby, various resin systems serve as adhesives, whose limiting temperatures lie within similar ranges.

For effecting measurements in the temperature range in excess of 300° C., utilization is made of free-grid strain gauges, i.e. of wire construction, which are cemented on through the intermediary of special ceramic adhesives, or are applied by a method which is related to plasma-jet spraying. For this purpose, the free-grid strain gauge must be located on an auxiliary or temporary backing having perforations or exposed locations, or a so-called masking. In order to fasten the strain gauge onto the test location, two operative steps are required, namely, (a) cementing or plasma-jet spraying the strain gauge grid elements through the perforations or exposed locations of the masking, and (b) stripping off of the masking and affixing the heretofore masked locations.

This described method for the second operative step generally works well for the normal size of grid but already poses considerable problems with regard to the smallest currently available high-temperature strain gauges which are of wire construction having a grid size of 3.2 × 1.6 mm. The connecting webs produced by the first operative step are, namely, so narrow (0.5 mm and less) that adhesibility to the base surface is not always adequate to again allow for stripping of the masking without injury to or deformation of the strain gauge grid during this sequence. Moreover, the high-temperature strain gauges have only a limited shelf life in view of the adhesive employed for the masking.

Additionally known in the art are free-grid strain gauges constituted of foil construction and having a miniaturized grid size of 0.8 × 0.8 mm. The actual measuring probe, comprising an etched foil formed of a chrome-nickel alloy, is supported on a continuous backing foil of plastic material foil of modified teflon, polyamide or a similar material. However, these types of foil constructed free-grid strain gauges cannot be processed by means of previously known methods for measuring applications at temperatures essentially in excess of 300° C.

SUMMARY OF THE INVENTION

Accordingly, it is a primary object of the present invention to provide a method for cementing miniature high-temperature strain gauges of foil construction using commercial ceramic cement and for processing them for high-temperature test applications.

It is a particular object of the present invention to provide a method whereby an auxiliary carrier or handling tab is welded to the strain gauges which are still equipped with the backing foils to facilitate manipulation of the grid by means of excess-length connecting webs; subjecting the strain gauge to a pretreatment in which the strain gauge is adhered, with its open grid side facing downwardly, onto a porous backing, or embedded therein, using a readily soluble adhesive; the carrier or backing foil being thereafter stripped off; the adhesive bedding being again dissolved through chemical means; the strain gauge then being applied to the appropriate measuring location after this pretreatment.

This pretreatment serves to remove the grid from the backing foil in such a manner whereby its geometric form remains unchanged. Only in this instance is there afforded a satisfactory adherence of the grid on the measuring location. Successful tests have been conducted exploying as adhesive, for example, Uhu-hart, nitro-diluted airplane adhesive lacquer or varnish, and nail polish used in the cosmetics industry.

The manipulation of the strain gauge is effectuated by means of the thereto welded auxiliary carrier which, preferably, is produced of metal and joined with the connecting webs through the intermediary of micro-spotwelds in a manner so that the webs and strain gauge grid are not subjected to stresses, thereby also precluding any damaging of the grid.

A further feature of the present invention lies in that the strain gauge grid is adjusted on the test location, the latter of which is provided with an insulating layer, by means of a drop of a readily volatile liquid, and is then fastened to the test location through the use of a drop of a ceramic adhesive.

The cohesive and adhesive properties of the liquid cement adhesive ensure complete embedding and satisfactory bonding of the flat grid structure to the surface of the base therebeneath.

BRIEF DESCRIPTION OF THE DRAWINGS

The foregoing and other objects and advantages of the novel method of applying a miniaturized strain gauge pursuant to the teachings of the present invention may be readily understood by one skilled in the art, with reference being made to the following detailed description of a preferred embodiment thereof, taken in conjunction with the accompanying drawings wherein like reference numerals are utilized to refer to ident: elements throughout, and in which.

DETAILED DESCRIPTION OF THE INVENTION

Figure 1:
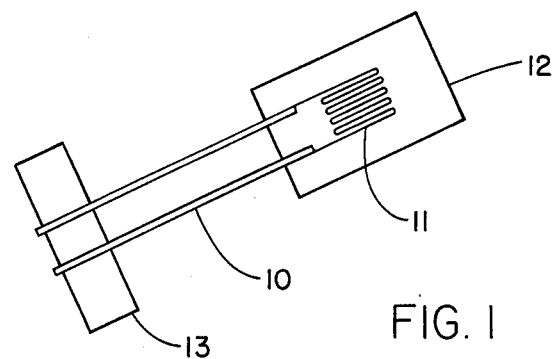
FIG. 1 is a plan view of a strain gauge connected to its backing foil prior to its application to a test location for measurement of the strain thereat.
Figure 2:
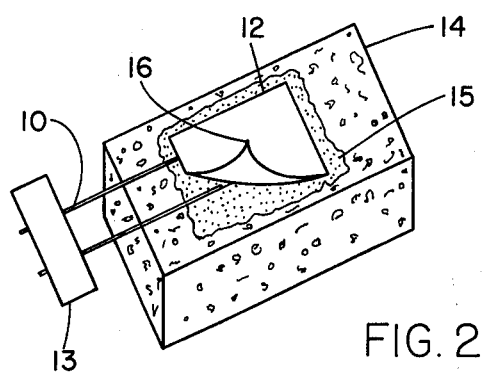
FIG. 2 illustrates the strain gauge shown in FIG. 1 during an intermediate step in the process of applying it to a test location during which the gauge is being adhered to a porous, porcelain body.

The present inventive method may now be elucidated by an illustrative example, as follows:

Initially, as shown in FIG. 1, excessively lengthy flat connecting webs 10 are micro-spotwelded to the strain gauge strips 11 while the latter are still connected with the backing foil 12 which may be constructed of a plastic material. The auxiliary metal carrier 13 (stainless steel, approximately 0.1 mm thick) is then fastened at a distance of about 20 mm to 30 mm from the base of the strain gauge 11, without generating of any internal stresses. With its grid side facing down, as shown in FIG. 2 the strain gauge 11 is then adhered on, or embedded in, a porous porcelain body 14 on which there has previously been applied, through repeated brushing, an adequate adhesive coating 15. During adhering and subsequent curing no bubbles or other inhomogeneities may be permitted to form beneath the strain gauge grid 11. The solvent medium must be able to evaporate through the porosity present in the base material beneath the impermeable backing foil.

Figure 3:
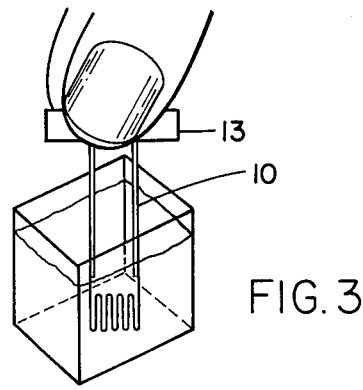
FIG. 3 is a further step in the application process wherein the strain gauge has been removed from the porcelain body, and the adhesive thereon is being dissolved in a solvent medium.

The backing foil 12 can then be peeled or stripped off by bending over a sharp edge 16. During stripping off of the foil, the bending angle should be at least 90° C. or greater. In contrast with the metal grid 11, the adhesion of the backing foil is so small that even tightly rolled backing foils, assuming proper prior adhering, allow themselves to be peeled off without difficulty, so that the strain gauge grid 11 remains embedded in the adhesive bed 15 with its shape and position unchanged. Finally, the adhesive bedding is dissolved in a solvent medium and the strain gauge removed and cleaned, as illustrated in FIG. 3 wherein all manipulations, attaching and positioning of the strain gauge is effectuated exclusively by means of the connecting webs or bands 10 which are welded to the auxiliary backing 13. The exposed strain gauge grid 11 is especially adapted to be cleaned through the intermediary of an ultrasonic bath.

Figure 4:
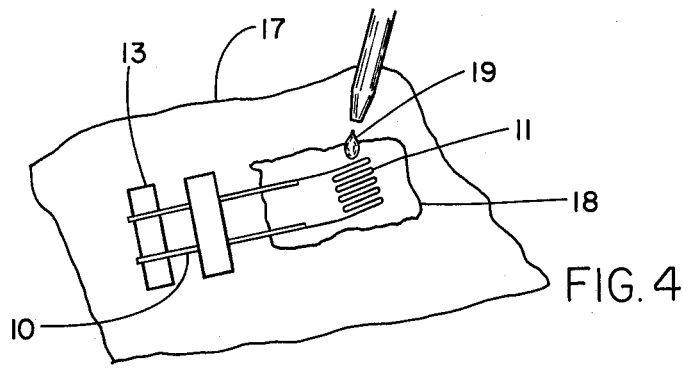
FIG. 4 illustrates one of the later steps in the application process wherein the strain gauge is being applied to the test location.

The strain gauge 11 which has been pretreated in this manner is now applied to the respective test location as shown in FIG. 4 which has been provided with an insulating layer 18, and in such a manner, that initially its grid 11 will not come into contact with the base surface therebeneath, so as not to be damaged. The correct position is then tested through the application of a drop 19 of alcohol or similar liquid 11 on the strain gauge. Through adhesion the metal grid is then uniformly drawn towards the base surface therebeneath and retained thereon. Upon evaporation of the alcohol these forces are again dissipated and eventual changes in the position of the strain gauge become possible.

A small drop of the cement solution is now applied, in a manner similar to that shown in FIG. 4 for the alcohol drop, to the somewhat spaced strain gauge grid, which is still a small distance from the surface below, which by means of gravity and adhesion, will uniformly and without deformation aspirate the grid towards the base surface therebeneath. Hereby the cement solution also penetrates below the grid and moistens the entire surface. The inherently porous base of the insulating layer concurrently absorbs a portion of the liquid and thusly provides for good adhesion to the layer situated therebelow.

Thereafter, the electrical leads can then be connected or soldered to the thus applied strain gauges. The connecting webs or bands 10 and the auxiliary metal backing 13 are then again removed and the test location may be masked and sealed in accordance with known methods.

Pursuant to the inventive method, the backing foil 12 can be stripped or peeled off without difficulty, and without producing the detrimental consequences associated, for instance, with the presently known evaporization method. Thereby, the backing foil is evaporated at temperatures in excess of 550° C. (in a vacuum furnace at at least $10^{-3}$ Torr), however, whereby carbon and other residues from the evaporating process precipitate on the metal components in the form of single-crystal formations and needles.

The method of the present invention allows that the essential advantages of the foil-type strain gauge, such as miniaturization, insensitivity to transverse or sectional contraction, suitability to mass production and improved precision, to be transmitted to the field of high-temperature measurement technology. The invention has also created a novel method for equipping with high-temperature sensors test objects of small size and complex configurations which will not permit the spraying on of an aluminum-oxide layer by means of the flame spraying process.

What is claimed is:

1. A method of applying a miniaturized high-temperature free-grid strain gauge of foil construction, or a similar high-temperature probe, supported on a backing foil to a test location, comprising the steps of:
    (a) connecting long web means to the strain gauge while the gauge still has its backing foil on;
    (b) connecting an auxiliary carrier to the web means at a distance from said gauge;
    (c) adhering said gauge to a porous backing with the open grid side thereof facing downwardly through a readily soluble adhesive;
    (d) peeling off the backing foil;
    (e) chemically dissolving the adhesive; and
    (f) applying the prepared gauge to the test location.

2. A method as claimed in claim 1, comprising applying an insulating layer to said test location; adjusting said strain gauge grid in said test location by applying a drop of a volatile liquid thereon; and fastening said grid to said test location by applying a drop of a ceramic cement adhesive.

3. A method as claimed in claim 1, said volatile liquid comprising alcohol.

4. A method as claimed in claim 3, said backing foil comprising a plastic material foil.

5. A method as claimed in claim 4, said auxiliary carrier being constituted of metal.

6. A method as claimed in claim 1, said backing foil comprising a plastic material foil.

7. A method as claimed in claim 1, said auxiliary carrier being constituted of metal.

* * * * *